(12) United States Patent
You et al.

(10) Patent No.: US 12,259,199 B2
(45) Date of Patent: Mar. 25, 2025

(54) OPERATION CONTROL SYSTEM AND METHOD FOR A CHILLER COOLING TOWER

(71) Applicant: FLOWTECH SYSTEMS CO., LTD., Bacheng Town (CN)

(72) Inventors: Wenyu You, Jiangsu (CN); Feng Xue, Jiangsu (CN)

(73) Assignee: FLOWTECH SYSTEMS CO., LTD., Bacheng Town (CN)

( * ) Notice: Subject to any disclaimer, the term of this patent is extended or adjusted under 35 U.S.C. 154(b) by 219 days.

(21) Appl. No.: 18/008,624

(22) PCT Filed: Dec. 29, 2021

(86) PCT No.: PCT/CN2021/142427
§ 371 (c)(1),
(2) Date: Dec. 6, 2022

(87) PCT Pub. No.: WO2022/143757
PCT Pub. Date: Jul. 7, 2022

(65) Prior Publication Data
US 2023/0221085 A1 Jul. 13, 2023

(30) Foreign Application Priority Data
Dec. 29, 2020 (CN) .......................... 202011593294.5

(51) Int. Cl.
*F28F 27/00* (2006.01)
*F28C 1/00* (2006.01)

(52) U.S. Cl.
CPC .............. *F28F 27/003* (2013.01); *F28C 1/00* (2013.01); *F28C 2001/006* (2013.01)

(58) Field of Classification Search
CPC ..... F28F 27/003; F28C 1/00; F28C 2001/006; F25B 2313/0294
See application file for complete search history.

(56) References Cited

U.S. PATENT DOCUMENTS

2021/0180891 A1*  6/2021  Rousselet ............. F28F 27/003

FOREIGN PATENT DOCUMENTS

| CA | 1215156 A | 12/1986 |
|---|---|---|
| CN | 110285615 A | 5/2012 |
| CN | 203190567 U | * 9/2013 |
| CN | 106871364 A | 6/2017 |
| CN | 107388882 A | 11/2017 |
| CN | 202216363 U | 3/2018 |
| CN | 107806695 A | 9/2019 |
| CN | 111076602 A | 4/2020 |
| CN | 211926629 U | 11/2020 |

(Continued)

OTHER PUBLICATIONS

International Search Report dated Mar. 24, 2022.

(Continued)

*Primary Examiner* — Joseph F Trpisovsky
(74) *Attorney, Agent, or Firm* — Michael Best & Friedrich LLP

(57) ABSTRACT

Provided are an operation control system and an operation control method for a chiller cooling tower. The operation control system includes a water chilling unit, a first temperature sensor, a second temperature sensor, a programmable logic controller, and an artificial intelligence controller.

16 Claims, 2 Drawing Sheets

(56) References Cited

FOREIGN PATENT DOCUMENTS

| | | |
|---|---|---|
| CN | 112556485 A | 3/2021 |
| CN | 214950836 U | 11/2021 |
| EP | 0115377 A2 * | 8/1984 |

OTHER PUBLICATIONS

Chinese Patent Office Search report for Application No. 202011593294.5 dated Apr. 1, 2024 (11 pages including English translation).

* cited by examiner

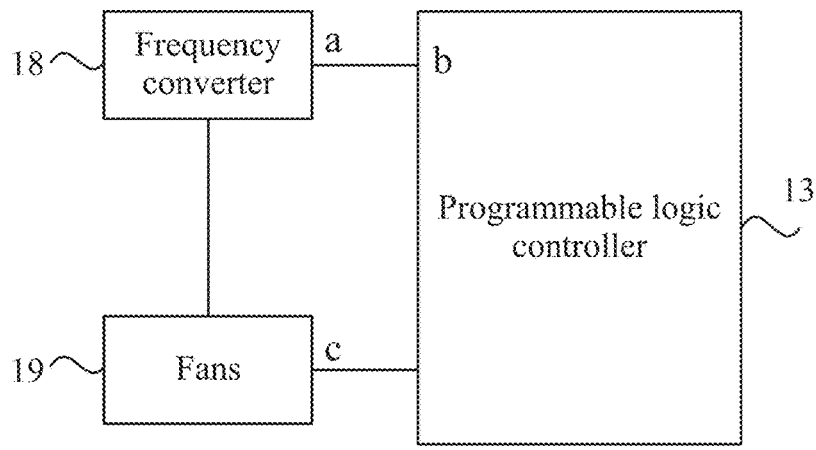

FIG. 3

| Determine an operating mode of fans according to a control output value of a programmable logic controller and a system-set output value of the operation control system, where the operating mode includes a first operating mode and a second operating mode, an operating frequency of fans in the second operating mode is higher than or equal to an operating frequency of fans in the first operating mode, and the number of fans turned on in the second operating mode is greater than or equal to the number of fans turned on in the first operating mode | ~S410 |

| Receive an outlet water temperature, a wet-bulb temperature, and a temperature change value and determine information about an adjustment to the operating frequency according to the outlet water temperature, the wet-bulb temperature, and the temperature change value in the second operating mode | ~S420 |

FIG. 4

OPERATION CONTROL SYSTEM AND METHOD FOR A CHILLER COOLING TOWER

CROSS-REFERENCES TO RELATED APPLICATIONS

This application is a national stage application filed under 35 U.S.C. 371 based on International Patent Application No. PCT/CN2021/142427, filed on Dec. 29, 2021, which claims priority to Chinese Patent Application No. 202011593294.5 filed with the China National Intellectual Property Administration (CNIPA) on Dec. 29, 2020, the disclosures of which are incorporated herein by reference in their entireties.

TECHNICAL FIELD

Embodiments of the present application relate to the technical field of chiller cooling, for example, an operation control system and method for a chiller cooling tower.

BACKGROUND

At present, most manufacturers use chillers and cooling towers to cool high-temperature equipment or products.

In the related art, for cooling water of a chiller, fans of a cooling tower are controlled to be turned on or off according to an outlet water temperature of the cooling tower. When there are multiple cooling towers, it is necessary to turn on or off the fans of the cooling towers one by one. The method has the following drawbacks: 1. The fans of the cooling tower are controlled to be turned on or off according to the outlet water temperature of the cooling tower, or the fans of the cooling towers are controlled to be turned on or off one by one such that a water mixing phenomenon will occur in a system; 2. the fans of the cooling tower are turned on or off frequently, which will shorten the lives of a motor and electrical elements; 3. a relatively large fluctuation in the outlet water temperature of the cooling tower leads to large energy consumption of the chiller and an increasing outlet water temperature; and 4. it is impossible to obtain an optimal refrigeration capacity of the chiller.

SUMMARY

Embodiments of the present application provide an operation control system and an operation control method for a chiller cooling tower, so as to implement cooling by using a heat dissipation area of a cooling tower instead of controlling, according to an outlet water temperature of the cooling tower, fans to be turned on or off, thereby avoiding a water mixing phenomenon in a system, preventing the fans of the cooling tower from being turned on or off frequently, prolonging service lives of a motor and electrical elements, and ensuring the stable operation of the system.

In a first aspect, embodiments of the present application provide an operation control system for a chiller cooling tower. The operation control system includes a water chilling unit, a first temperature sensor, a second temperature sensor, a programmable logic controller, and an artificial intelligence controller.

The water chilling unit includes a water chiller and a water cooling tower, where multiple fans are disposed in the water cooling tower.

The first temperature sensor is configured to sense an outlet water temperature of the water cooling tower.

The second temperature sensor is configured to sense a wet-bulb temperature outside the water chilling unit.

The artificial intelligence controller is communicatively connected to the first temperature sensor and is configured to determine a temperature change value according to the outlet water temperature and a current operating frequency of the fans.

The programmable logic controller is configured to determine an operating mode of the fans according to a control output value of the programmable logic controller and a system-set output value of the operation control system, where the operating mode includes a first operating mode and a second operating mode, an operating frequency of the fans in the second operating mode is higher than or equal to an operating frequency of the fans in the first operating mode, and the number of fans turned on in the second operating mode is greater than or equal to the number of fans turned on in the first operating mode.

The programmable logic controller is communicatively connected to the first temperature sensor, the second temperature sensor, and the artificial intelligence controller separately, and the programmable logic controller is configured to determine, in the first operating mode and the second operating mode, information about an adjustment to the operating frequency according to the outlet water temperature, the wet-bulb temperature, and the temperature change value.

In a second aspect, embodiments of the present application further provide an operation control method for a chiller cooling tower. The method containing the operation control system according to the first aspect includes the steps described below.

An operating mode of fans is determined according to the control output value of the programmable logic controller and the system-set output value of the operation control system, where the operating mode includes the first operating mode and the second operating mode, the operating frequency of the fans in the second operating mode is higher than or equal to the operating frequency of the fans in the first operating mode, and the number of fans turned on in the second operating mode is greater than or equal to the number of fans turned on in the first operating mode;

In the second operating mode, the programmable logic controller receives the outlet water temperature, the wet-bulb temperature, and the temperature change value and determines information about an adjustment to the operating frequency according to the outlet water temperature, the wet-bulb temperature, and the temperature change value, and the programmable logic controller controls the fans to operate at the second operating frequency, wherein the second operating frequency is adjustable.

BRIEF DESCRIPTION OF DRAWINGS

FIG. 3 is a partial enlarged view of another operation control system structure according to an embodiment of the present application; and FIG. 4 is a flowchart of an operation control method for a chiller cooling tower according to an embodiment of the present application.

DETAILED DESCRIPTION

Embodiments, structures, features, and effects of an operation control system and an operation control method for a chiller cooling tower provided according to the present application are described hereinafter in detail with reference to drawings and exemplarily embodiments.

Details are set forth below to facilitate a thorough understanding of the present application. However, the present application may be implemented by other embodiments different from the embodiments described herein, and those skilled in the art may make similar generalizations without departing from the spirit of the present application. Therefore, the present application is not limited to the embodiments described below.

Figure 1:
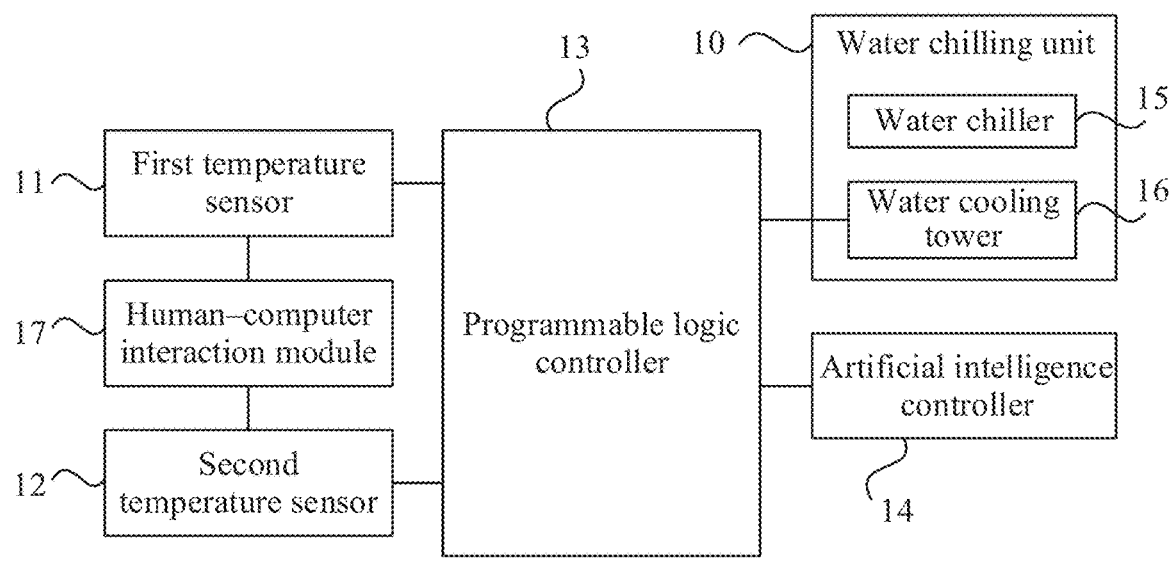
FIG. 1 is a structural diagram of an operation control system for a chiller cooling tower according to an embodiment of the present application.

FIG. 1 is a structural diagram of an operation control system for a chiller cooling tower according to an embodiment of the present application. As shown in FIG. 1, the operation control system includes a water chilling unit 10, a first temperature sensor 11, a second temperature sensor 12, a programmable logic controller 13, and an artificial intelligence controller 14. The water chilling unit 10 includes a water chiller 15 and a water cooling tower 16, where multiple fans (not shown) are disposed in the water cooling tower 16. The first temperature sensor 11 is configured to sense an outlet water temperature of the water cooling tower 16. The second temperature sensor 12 is configured to sense a wet-bulb temperature outside the water chilling unit 10. The artificial intelligence controller 14 is communicatively connected to the first temperature sensor 11 and is configured to determine a temperature change value according to the outlet water temperature and a current operating frequency of the fans (for example, the artificial intelligence controller 14 may automatically reset the temperature change value according to the outlet water temperature and the current operating frequency of the fans). The programmable logic controller 13 is configured to determine an operating mode of the fans according to a control output value of the programmable logic controller 13 and a system-set output value of the operation control system, where the operating mode includes a first operating mode and a second operating mode, an operating frequency of the fans in the second operating mode is higher than or equal to an operating frequency of the fans in the first operating mode, and the number of fans turned on in the second operating mode is greater than or equal to the number of fans turned on in the first operating mode. The programmable logic controller 13 is communicatively connected to the first temperature sensor 11, the second temperature sensor 12, and the artificial intelligence controller 14 separately, and the programmable logic controller 13 is configured to determine, in the first operating mode and the second operating mode, information about an adjustment to the operating frequency according to the outlet water temperature, the wet-bulb temperature, and the temperature change value.

The water cooling tower 16 in the water chilling unit 10 is a device for cooling water and widely used in circulation systems of air conditioners and industrial circulating water systems. The water cooling tower 16 dissipates, through the contact between water and air and the action of evaporation, heat generated in the industry or by air conditioners for refrigeration. In addition, the second temperature sensor 12 is a wet-bulb temperature sensor which is configured to acquire a wet-bulb temperature of air outside the water chilling unit 10. In this embodiment, the wet-bulb temperature sensor may be a wet-bulb thermometer, and a measured wet-bulb temperature outside the water chilling unit 10 may be denoted by WB. The first temperature sensor 11 is configured to acquire a temperature on a water outlet side of the water cooling tower 16 and can control the operating frequency of the multiple fans in the water cooling tower 16 according to a level of the outlet water temperature of the water cooling tower 16, where the outlet water temperature of the cooling tower may be denoted by T.

In addition, the artificial intelligence controller 14 acquires, through calculation according to the increase or decrease of the outlet water temperature of the water cooling tower 16, one temperature change value which may be dynamically adjusted in real time, where the temperature change value is denoted by $\Delta T$. In this embodiment, in the artificial intelligence controller 14, the specific calculation principle and steps for calculating the temperature change value according to the outlet water temperature of the water cooling tower 16 and the current operating frequency of the fans are known to those skilled in the art, which is not explained here. The sum of the wet-bulb temperature WB outside the water chilling unit 10 and the temperature change value $\Delta T$ which is calculated by the artificial intelligence controller 14 and may be dynamically adjusted is used as a set value. The set value is dynamically set in real time (for example, the set value may be reset) along with the change of the wet-bulb temperature of the air outside the water chilling unit 10. Thus, the operating frequency of the fans in the water cooling tower 16 can be ensured.

It is to be noted that the programmable logic controller 13 in this embodiment is commonly used in a closed-loop system, which is equivalent to a regulator. When the outlet water temperature of the water cooling tower 16 changes, the programmable logic controller 13 sends a signal to adjust its own control output value (there is a corresponding relationship between a range of the control output value and a range of the operating frequency of the fans) so that the change of the water temperature can be quickly tracked and a steady-state error can be eliminated.

The multiple fans in the water cooling tower 16 operate in two modes. The operating mode of the multiple fans is determined according to the relationship between the magnitude of the control output value of the programmable logic controller 13 and the magnitude of the system-set output value of the operation control system. In this embodiment, the first operating mode is an ON-OFF mode, and the second operating mode is a proportion integration differential (PID) mode. When the control output value of the programmable logic controller 13 is less than the system-set output value of the operation control system, the multiple fans in the water cooling tower 16 operate in the first operating mode, that is, the ON-OFF mode. When the control output value of the programmable logic controller 13 is greater than or equal to the system-set output value of the operation control system, the multiple fans in the water cooling tower 16 operate in the second operating mode, that is, the PID mode. When operating in the first operating mode, the multiple fans in the water cooling tower 16 operate at a first preset frequency, where the frequency remains unchanged. When operating in the second operating mode, the multiple fans in the water cooling tower 16 operate at a second preset frequency (the second preset frequency increases or decreases simultaneously with a frequency calculated by the programmable logic controller 13).

Figure 2:
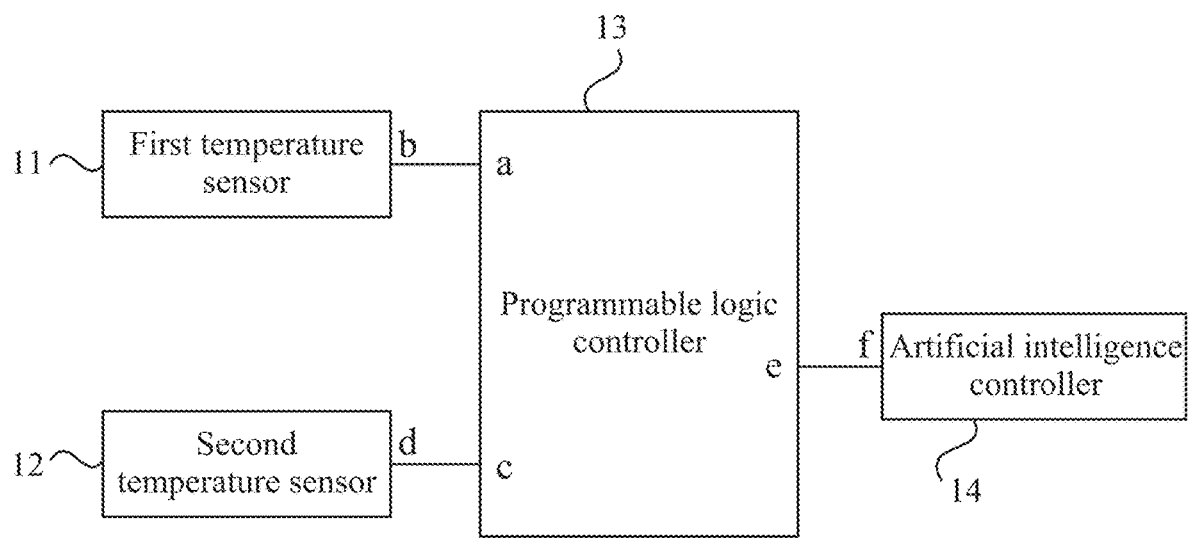
FIG. 2 is a partial enlarged view of an operation control system structure according to an embodiment of the present application.

In addition, it is to be noted that FIG. 2 is a partial enlarged view of an operation control system structure according to an embodiment of the present application. As shown in FIG. 2, to facilitate the understanding of connection relationships between multiple components in the operation control system for the chiller cooling tower, the description is as follows: a first end a of the programmable logic controller 13 is connected to an output end b of the first temperature sensor 11 which outputs the outlet water temperature T, a second end c of the programmable logic controller 13 is connected to an output end d of the second temperature sensor 12 which outputs the wet-bulb temperature WB, and a third end e of the programmable logic controller 13 is connected to an output end f of the artificial intelligence controller 14 which outputs the temperature change value $\Delta T$. The information about the adjustment to the operating frequency of the fans in the water cooling tower is determined according to the outlet water temperature T, the wet-bulb temperature WB, and the temperature change value $\Delta T$ which are acquired, so that the energy-saving and smooth operation of the fans in the water cooling tower is ensured.

The operation control system for the chiller cooling tower provided by this embodiment includes the water chilling unit, the first temperature sensor, the second temperature sensor, the programmable logic controller, and the artificial intelligence controller. The water chilling unit includes the water chiller and the water cooling tower, where the multiple fans are disposed in the water cooling tower. The first temperature sensor is configured to sense the outlet water temperature of the water cooling tower. The second temperature sensor is configured to sense the wet-bulb temperature outside the water chilling unit. The artificial intelligence controller is communicatively connected to the first temperature sensor and is configured to determine the temperature change value according to the outlet water temperature and the current operating frequency of the fans. The programmable logic controller is configured to determine the operating mode of the fans according to the control output value of the programmable logic controller and the system-set output value of the operation control system, where the operating mode includes the first operating mode and the second operating mode, the operating frequency of the fans in the second operating mode is higher than or equal to the operating frequency of the fans in the first operating mode, and the number of the fans turned on in the second operating mode is greater than or equal to the number of the fans turned on in the first operating mode. The programmable logic controller is communicatively connected to the first temperature sensor, the second temperature sensor, and the artificial intelligence controller separately, and the programmable logic controller is configured to determine, in the second operating mode, the information about the adjustment to the operating frequency according to the outlet water temperature, the wet-bulb temperature, and the temperature change value. The frequency conversion of the fans of the water cooling tower is controlled by comparing the outlet water temperature of the water cooling tower with the sum of the wet-bulb temperature outside the water chilling unit and the temperature change value determined according to the outlet water temperature and the current operating frequency of the fans. The operating mode of the fans is determined according to the control output value of the programmable logic controller and the system-set output value of the operation control system. In this manner, heat dissipation is performed by using the area of the cooling tower to a maximum extent so that energy is saved and energy consumption of a chiller is reduced, thereby avoiding a water mixing phenomenon in a system and ensuring the stable operation of the system.

When the control output value is less than the system-set output value, the programmable logic controller is configured to control the fans to operate in the first operating mode. When the fans operate in the first operating mode, the programmable logic controller is configured to control the fans to operate at a first operating frequency, where the first operating frequency is fixed. The programmable logic controller is further configured to control the multiple fans to be turned on, where the number of the fans turned on is adjustable.

In the preceding embodiment, an example may be used for illustrating that the operating mode of the multiple fans is determined according to the relationship between the magnitude of the control output value of the programmable logic controller and the magnitude of the system-set output value of the operation control system.

For example, the programmable logic controller is commonly used in the closed-loop system. When the outlet water temperature of the water cooling tower changes, the programmable logic controller sends the signal to adjust its own control output value (there is the corresponding relationship between the range of the control output value and the range of the operating frequency of the fans). For example, in this case, the control output value of the programmable logic controller is 40%. Calculation formulas for the system-set output value suitable for the case where the fans in the operation control system are turned on sequentially are as follows: $System^{1on}=System^{1off+DIFF}$, $System^{2off}=System^{1on-DIFF/2}$, $System^{2on}=System^{1on+DIFF/2}$, and $System^{Non}=System^{(N-1)\ on+DIFF/2}$, where N denotes the number of the fans turned on in the operation control system, and DIFF denotes a customized value in the programmable logic controller and DIFF=18%. In addition, in the water cooling tower, a control value for turning off one fan is as follows: $System^{1off=2\%}$.

The following values may be obtained through calculations with the preceding formulas: $System^{1on=20\%}$, $System^{2on=29\%}$, $System^{3on=38\%}$, and $System^{4on=47\%}$. When a fourth fan in the operation control system is turned on in turn, the control output value 40% of the programmable logic controller is less than the value of System 4on. In this case, the multiple fans in the water cooling tower operate in the first operating mode, that is, the ON-OFF mode. That is, in the entire closed-loop system, the control output value 47% of the programmable logic controller is used as a node for controlling the operation of the fans. That is, when the control output value of the programmable logic controller is less than 47%, the operating mode of the fans is the first operating mode, that is, the ON-OFF mode. In this case, the fans operate at a fixed first preset frequency. In this embodiment, the first preset frequency is 20 Hz.

It is to be noted that in the entire closed-loop system, the programmable logic controller can send the signal to adjust its own control output value (there is the corresponding relationship between the range of the control output value and the range of the operating frequency of the fans) when the outlet water temperature of the water cooling tower changes so that the change of the water temperature is quickly tracked. Thus, the multiple fans in the water cooling tower can be controlled to be turned on. The specific method for controlling the fans to be turned on or controlling the number of the fans to be turned on is implemented after an operator sets the programmable logic controller, which is not explained here.

The programmable logic controller is configured to control N fans to be sequentially turned on, where N≥2, and N is an integer. Time when an i-th fan is turned on is earlier than time when an (i+1)-th fan is turned on, and accumulated operating time of the i-th fan is less than accumulated operating time of the (i+1)-th fan, where 1≤i<N, and i is the integer.

The programmable logic controller controls the N fans in the water cooling tower to be turned on sequentially, and the accumulated operating time of a fan is determined each time the fan is turned on or off. Among the N fans, a fan with a short accumulated operating time is turned on first, and a fan with a long accumulated operating time is turned off first. In this manner, the programmable logic controller can control the fans to be turned on or control the number of fans to be turned on so that the entire system is cooled.

For example, in the entire system, there are ten fans in the water chilling unit. In the process of turning on the fans sequentially, accumulated operating time of a fifth fan is less than operating time of a sixth fan since the fifth fan is turned on before the sixth fan.

It is to be noted that in the entire system, accumulated operating time of the N fans and operating time of each of the N fans are counted simultaneously. Counted time during which each fan operates singly may be reset to zero.

When the control output value is greater than or equal to the system-set output value, the programmable logic controller is configured to control the fans to operate in the second operating mode. When the fans operate in the second operating mode, the programmable logic controller is configured to control the fans to operate at a second operating frequency, where the second operating frequency is adjustable (for example, the second operating frequency may be adjusted automatically). The programmable logic controller is further configured to control the multiple fans to be turned on, where the number of the fans turned on is fixed.

In the preceding embodiment, the specific description has been made about the case where the control output value of the programmable logic controller is less than the system-set output value. Similarly, the programmable logic controller is commonly used in the closed-loop system. When the outlet water temperature of the water cooling tower changes, the programmable logic controller sends the signal to adjust its own control output value (there is the corresponding relationship between the range of the control output value and the range of the operating frequency of the fans). For example, in this case, the control output value of the programmable logic controller is 40%. According to the calculation formulas of the system-set output value suitable for the case where the fans in the operation control system are turned on sequentially, the following values may be obtained through the calculations: $\text{System}^{1on=20\%}$, $\text{System}^{2on=29\%}$, $\text{System}^{3on=38\%}$, and $\text{System}^{4on=47\%}$. When the fourth fan in the operation control system is turned on in turn, the control output value 40% of the programmable logic controller is less than the value of System4on. In this case, the multiple fans in the water cooling tower operate in the first operating mode. The control output value 47% of the programmable logic controller is used as the node for controlling the operation of the fans. When the control output value of the programmable logic controller is greater than or equal to 47%, the operating mode of the fans is the second operating mode, that is, the PID mode. In this case, the fans operate at the second preset frequency. The second preset frequency is a changing value which may be adjusted within a preset range. In this embodiment, an adjustment range of the second preset frequency is 20 Hz to 50 Hz.

The programmable logic controller is configured to increase the operating frequency of the fans when the sum of the wet-bulb temperature and the temperature change value is less than the outlet water temperature. The programmable logic controller is configured to reduce the operating frequency of the fans when the sum of the wet-bulb temperature and the temperature change value is greater than the outlet water temperature.

In this embodiment, the sum of the wet-bulb temperature WB and the temperature change value $\Delta T$ is used as the set value. The magnitude of the set value is compared with the magnitude of the outlet water temperature T of the water cooling tower. In this manner, the outlet water temperature of the water cooling tower may be controlled to be constant according to the change of the set value, thereby controlling the fans to operate stably.

When WB+$\Delta T$<T, the temperature on the water outlet side of the water cooling tower is relatively high. In this case, if the programmable logic controller does not increase the operating frequency of the fans, the energy consumption of the chiller in the water chilling unit will increase, which will lead to a relatively large fluctuation in an outlet water temperature on a chilled-water side. When the programmable logic controller increases the operating frequency of the fans, the multiple fans in the water cooling tower operate in the second operating mode, that is, the PID mode. In this mode, within the adjustment range of 20 Hz to 50 Hz, the operating frequency of the fans increase in a positive direction as the control output value of the programmable logic controller increases so that the outlet water temperature of the water cooling tower can be controlled to be constant. Similarly, when WB+$\Delta T$>T, it is indicated that a set temperature value is too large when the operating frequency of the fans are adjusted. In this case, the operating frequency of the fans are reduced by the programmable logic controller so that the fans are controlled to operate in the first operating mode, where the operating frequency of the fans are reduced to 20 Hz for reducing a fluctuation in the outlet water temperature of the water cooling tower.

FIG. 3 is a partial enlarged view of another operation control system structure according to an embodiment of the present application. As shown in FIG. 3, the operation control system further includes a frequency converter 18. An input end a of the frequency converter 18 is connected to an output end b of the programmable logic controller 13, and an output end c of the frequency converter 18 is connected to the fans 19. The programmable logic controller 13 is configured to output the information about the adjustment to the operating frequency to the frequency converter 18. The frequency converter 18 is configured to adjust the operating frequency according to the information about the adjustment and then send information about the adjusted operating frequency to the fans 19, so as to control the fans 19 to operate.

The frequency converter 18 is an electrical energy control component which converts its working frequency into another working frequency through the action of turning on or off power semiconductor devices.

Based on the preceding embodiment, the magnitude of the sum (WB+$\Delta T$) of the wet-bulb temperature and the temperature change value is compared with the magnitude of the outlet water temperature T such that the programmable logic controller 13 outputs the information about the adjustment to the operating frequency to the frequency converter 18, the frequency converter 18 adjusts the operating frequency according to the information about the adjustment and then sends the information about the adjusted operating frequency to the fans 19, and the fans 19 operate at the adjusted operating frequency. For example, when WB+$\Delta T$<T, the temperature on the water outlet side of the water cooling tower is relatively high. The programmable logic controller 13 avoids this situation by increasing the operating frequency of the fans 19. The programmable logic controller 18 outputs adjustment information about increasing the frequencies of the fans 19 to the frequency converter, the frequency converter 18 sends the information about the adjusted operating frequency to the fans 19 according to the received adjustment information, and the fans 19 performs current work with the received information about the operating frequency so that the outlet water temperature of the water cooling tower can be controlled to be constant.

With continued reference to FIG. 1, the operation control system further includes a human-computer interaction module 17 which is communicatively connected to a first temperature sensing module 11, a second temperature sensing module 12, and the frequency converter separately. The human-computer interaction module is configured to display the outlet water temperature, the wet-bulb temperature, and the operating frequency.

An interaction function of the human-computer interaction module is mainly implemented through a user interface.

For example, in this embodiment, the human-computer interaction module may be an inductive liquid crystal display device which feeds back parameters to a user from a visual effect with its special characteristic of display transparency. When the human-computer interaction module in the operation control system is connected to the first temperature sensing module, the second temperature sensing module, and the frequency converter, the user or the operator can obtain the outlet water temperature of the water cooling tower, the wet-bulb temperature outside the water chilling unit, and the operating frequency of the fans in time. For the case where the outlet water temperature is relatively high or the operating frequency of the fans are relatively low in the operation control system, adjustments may be performed in time through the human-computer interaction module, thereby avoiding damage to the motor.

FIG. 4 is a flowchart of an operation control method for a chiller cooling tower according to an embodiment of the present application. The method contains the operation control system provided by any one of the preceding embodiments. As shown in FIG. 3, the operation control method may include the steps described below.

In S410, an operating mode of fans is determined according to a control output value of a programmable logic controller and a system-set output value of the operation control system, where the operating mode includes a first operating mode and a second operating mode, operating frequency of fans in the second operating mode is higher than or equal to operating frequency of fans in the first operating mode, and the number of fans turned on in the second operating mode is greater than or equal to the number of fans turned on in the first operating mode.

The content about that the operating mode of the fans is determined according to the control output value of the programmable logic controller and the system-set output value of the operation control system has been explained and described in the preceding embodiment. The details are not repeated here.

In S420, an outlet water temperature, a wet-bulb temperature, and a temperature change value are received and information about an adjustment to the operating frequency is determined according to the outlet water temperature, the wet-bulb temperature, and the temperature change value in the second operating mode.

When the control output value of the programmable logic controller is greater than or equal to an output value of the system, the operating mode of the fans is the second operating mode, that is, a PID mode. In this case, the programmable logic controller outputs the information about the adjustment to the operating frequency to a frequency converter, the frequency converter adjusts the operating frequency according to the information about the adjustment and then sends information about the adjusted operating frequency to the fans, and the fans operate at the adjusted operating frequency. That is, the fans operate at a second frequency. A second preset frequency is a changing value which may be adjusted within a preset range. In this embodiment, an adjustment range of the second preset frequency is 20 Hz to 50 Hz.

It is to be specially noted that in this embodiment, the sum of the wet-bulb temperature WB and the temperature change value $\Delta T$ is used as a set value, and when the fans operate at the second frequency, it is necessary to ensure that the set value is within a certain water temperature range.

It is assumed that a low limit of the water temperature range is SP1 and a high limit of the water temperature range is SP2. When the sum WB+$\Delta T$ is beyond the set low limit SP1 and high limit SP2, the low limit SP1 of a water temperature range of cooling water of a water chiller needs to be reset in real time according to a load rate of the water chiller since a water chilling unit needs to control an inlet water temperature of the cooling water of the water chiller and improve an energy efficiency ratio of the water chiller. In this manner, cooling can be implemented and thus the energy efficiency ratio of the entire water chilling unit is improved. After the low limit SP1 of the water temperature range is reset, this low limit SP1 is used as a low water temperature limit currently set for controlling the operation of the fans, and the high limit remains unchanged.

The operation control method further includes the following steps: the fans are controlled in the first operating mode to operate at a first operating frequency, where the first operating frequency is fixed; and N fans are controlled to be turned on sequentially, where N≥2, and N is an integer. Time when an i-th fan is turned on is earlier than time when an (i+1)-th fan is turned on, and accumulated operating time of the i-th fan is less than accumulated operating time of the (i+1)-th fan, where 1≤i<N, and i is the integer.

The description about that the programmable logic controller controls the N fans in the water cooling tower to be turned on sequentially has been explained in the preceding embodiment. The details are not repeated here.

Determining the information about the adjustment to the operating frequency according to the outlet water temperature, the wet-bulb temperature, and the temperature change value includes the following steps: when the sum of the wet-bulb temperature and the temperature change value is less than the outlet water temperature, the operating frequency of the fans are increased; and when the sum of the wet-bulb temperature and the temperature change value is greater than the outlet water temperature, the operating frequency of the fans are reduced.

When WB+$\Delta T$<T, a temperature on a water outlet side of the water cooling tower is relatively high. In this case, if the programmable logic controller does not increase the operating frequency of the fans, the energy consumption of a chiller in the water chilling unit will increase, leading to a relatively large fluctuation in an outlet water temperature on a chilled-water side. When the programmable logic controller increases the operating frequency of the fans, multiple fans in the water cooling tower operate in the second operating mode, that is, the PID mode. In this mode, within an adjustment range of 20 Hz to 50 Hz, the operating frequency of the fans increase in a positive direction as the control output value of the programmable logic controller increases so that the outlet water temperature of the water cooling tower can be controlled to be constant. Similarly, when WB+ΔT>T, it is indicated that a set temperature value is too large when the operating frequency of the fans are adjusted. In this case, the operating frequency of the fans are reduced by the programmable logic controller so that the fans are controlled to operate in the first operating mode. The operating frequency of the fans are reduced to 20 Hz, and the fans in the cooling tower are unloaded one by one when the outlet water temperature continues to decrease so that a fluctuation in the outlet water temperature of the water cooling tower is reduced.

What is claimed is:

1. An operation control system for a chiller cooling tower, comprising a water chilling unit, a first temperature sensor, a second temperature sensor, a programmable logic controller, and an artificial intelligence controller;
   wherein the water chilling unit comprises a water chiller and a water cooling tower, wherein a plurality of fans are disposed in the water cooling tower;
   the first temperature sensor is configured to sense an outlet water temperature of the water cooling tower;
   the second temperature sensor is configured to sense a wet-bulb temperature outside the water chilling unit;
   the artificial intelligence controller is communicatively connected to the first temperature sensor and is configured to determine a temperature change value according to the outlet water temperature and a current operating frequency of the fans;
   the programmable logic controller is configured to determine an operating mode of the fans according to a control output value of the programmable logic controller and a system-set output value of the operation control system, wherein the operating mode comprises a first operating mode and a second operating mode, an operating frequency of the fans in the second operating mode is higher than or equal to an operating frequency of the fans in the first operating mode, and a number of fans turned on in the second operating mode is greater than or equal to a number of fans turned on in the first operating mode; and
   the programmable logic controller is communicatively connected to the first temperature sensor, the second temperature sensor, and the artificial intelligence controller separately, and the programmable logic controller is configured to determine, in the first operating mode and the second operating mode, information about an adjustment to the operating frequency according to the outlet water temperature, the wet-bulb temperature, and the temperature change value.

2. The operation control system according to claim 1, wherein in response to determining that the control output value is less than the system-set output value, the programmable logic controller is configured to control the fans to operate in the first operating mode; and
   the programmable logic controller is configured to control, in the first operating mode, the fans to operate at a first operating frequency, wherein the first operating frequency is fixed; and the programmable logic controller is further configured to control the fans among the plurality of fans to be turned on, wherein a number of the fans turned on is adjustable.

3. The operation control system according to claim 2, wherein the programmable logic controller is configured to control N fans among the plurality of fans to be turned on, wherein N≥2, and N is an integer;
   wherein time when an i-th fan is turned on is earlier than time when an (i+1)-th fan is turned on, and accumulated operating time of the i-th fan is less than accumulated operating time of the (i+1)-th fan, wherein 1≤i<N, and i is the integer.

4. The operation control system according to claim 1, wherein in response to determining that the control output value is greater than or equal to the system-set output value, the programmable logic controller is configured to control the fans to operate in the second operating mode; and
   the programmable logic controller is configured to control, in the second operating mode, the fans to operate at a second operating frequency, wherein the second operating frequency is adjustable; and the programmable logic controller is further configured to control the fans among the plurality of fans to be turned on, wherein a number of the fans turned on is fixed.

5. The operation control system according to claim 4, wherein in response to determining that a sum of the wet-bulb temperature and the temperature change value is less than the outlet water temperature, the programmable logic controller is configured to increase the second operating frequency of the fans; and
   in response to determining that the sum of the wet-bulb temperature and the temperature change value is greater than the outlet water temperature, the programmable logic controller is configured to reduce the second operating frequency of the fans.

6. The operation control system according to claim 1, further comprising a frequency converter;
   wherein an input end of the frequency converter is connected to an output end of the programmable logic controller, and an output end of the frequency converter is connected to the fans; the programmable logic controller is configured to output the information about the adjustment to the operating frequency of the fans to the frequency converter; and the frequency converter is configured to adjust the operating frequency of the fans according to the information about the adjustment and then send information about the adjusted operating frequency to the fans, so as to control the fans to operate.

7. The operation control system according to claim 6, further comprising a human-computer interaction module which is communicatively connected to a first temperature sensing module, a second temperature sensing module, and the frequency converter separately;
   wherein the human-computer interaction module is configured to display the outlet water temperature, the wet-bulb temperature, and the operating frequency.

8. An operation control method for a chiller cooling tower, the method being applied to an operation control system and comprising:
   determining an operating mode of fans according to a control output value of a programmable logic controller and a system-set output value of the operation control system, wherein the operating mode comprises a first operating mode and a second operating mode, an operating frequency of the fans in the second operating mode is higher than or equal to an operating frequency of the fans in the first operating mode, and a number of fans turned on in the second operating mode is greater than or equal to a number of fans turned on in the first operating mode;
   wherein the programmable logic controller receives, in the second operating mode, an outlet water temperature, a wet-bulb temperature, and a temperature change value and determines information about an adjustment to the operating frequency according to the outlet water temperature, the wet-bulb temperature, and the temperature change value, and the programmable logic controller controls the fans to operate at a second operating frequency, wherein the second operating frequency is adjustable, wherein the operation control system comprises a water chilling unit, a first temperature sensor, a second temperature sensor, the programmable logic controller, and an artificial intelligence controller;

wherein the water chilling unit comprises a water chiller and a water cooling tower, wherein the fans are disposed in the water cooling tower;

the first temperature sensor is configured to sense the outlet water temperature of the water cooling tower;

the second temperature sensor is configured to sense the wet-bulb temperature outside the water chilling unit;

the artificial intelligence controller is communicatively connected to the first temperature sensor and is configured to determine the temperature change value according to the outlet water temperature and a current operating frequency of the fans;

the programmable logic controller is configured to determine the operating mode of the fans according to the control output value of the programmable logic controller and the system-set output value of the operation control system, wherein the operating mode comprises the first operating mode and the second operating mode, the operating frequency of the fans in the second operating mode is higher than or equal to the operating frequency of the fans in the first operating mode, and the number of fans turned on in the second operating mode is greater than or equal to a number of fans turned on in the first operating mode; and the programmable logic controller is communicatively connected to the first temperature sensor, the second temperature sensor, and the artificial intelligence controller separately, and the programmable logic controller is configured to determine, in the first operating mode and the second operating mode, information about an adjustment to the operating frequency according to the outlet water temperature, the wet-bulb temperature, and the temperature change value.

9. The operation control method according to claim 8, further comprising:

controlling, in the first operating mode, the fans to operate at the first operating frequency, wherein the first operating frequency is fixed; and controlling N fans to be turned on sequentially, wherein $N \geq 2$, and N is an integer;

wherein time when an i-th fan is turned on is earlier than time when an (i+1)-th fan is turned on, and accumulated operating time of the i-th fan is less than accumulated operating time of the (i+1)-th fan, wherein $1 \leq i < N$, and i is the integer.

10. The operation control method according to claim 8, wherein determining the information about the adjustment to the operating frequency according to the outlet water temperature, the wet-bulb temperature, and the temperature change value comprising:

increasing the second operating frequency of the fans in response to determining that a sum of the wet-bulb temperature and the temperature change value is less than the outlet water temperature; and reducing the second operating frequency of the fans in response to determining that the sum of the wet-bulb temperature and the temperature change value is greater than the outlet water temperature.

11. The operation control method according to claim 8, wherein in response to determining that the control output value is less than the system-set output value, the programmable logic controller is configured to control the fans to operate in the first operating mode; and the programmable logic controller is configured to control, in the first operating mode, the fans to operate at a first operating frequency, wherein the first operating frequency is fixed; and the programmable logic controller is further configured to control the fans among the plurality of fans to be turned on, wherein a number of the fans turned on is adjustable.

12. The operation control method according to claim 11, wherein the programmable logic controller is configured to control N fans among the plurality of fans to be turned on, wherein $N \geq 2$, and N is an integer;

wherein time when an i-th fan is turned on is earlier than time when an (i+1)-th fan is turned on, and accumulated operating time of the i-th fan is less than accumulated operating time of the (i+1)-th fan, wherein $1 \leq i < N$, and i is the integer.

13. The operation control method according to claim 8, wherein in response to determining that the control output value is greater than or equal to the system-set output value, the programmable logic controller is configured to control the fans to operate in the second operating mode; and the programmable logic controller is configured to control, in the second operating mode, the fans to operate at a second operating frequency, wherein the second operating frequency is adjustable; and the programmable logic controller is further configured to control the fans among the plurality of fans to be turned on, wherein a number of the fans turned on is fixed.

14. The operation control method according to claim 13, wherein in response to determining that a sum of the wet-bulb temperature and the temperature change value is less than the outlet water temperature, the programmable logic controller is configured to increase the second operating frequency of the fans; and in response to determining that the sum of the wet-bulb temperature and the temperature change value is greater than the outlet water temperature, the programmable logic controller is configured to reduce the second operating frequency of the fans.

15. The operation control method according to claim 8, further comprising a frequency converter;

wherein an input end of the frequency converter is connected to an output end of the programmable logic controller, and an output end of the frequency converter is connected to the fans; the programmable logic controller is configured to output the information about the adjustment to the operating frequency of the fans to the frequency converter; and the frequency converter is configured to adjust the operating frequency of the fans according to the information about the adjustment and then send information about the adjusted operating frequency to the fans, so as to control the fans to operate.

16. The operation control method according to claim 15, further comprising a human-computer interaction module which is communicatively connected to a first temperature sensing module, a second temperature sensing module, and the frequency converter separately;

wherein the human-computer interaction module is configured to display the outlet water temperature, the wet-bulb temperature, and the operating frequency.

* * * * *